Sept. 21, 1926. 1,600,785
W. H. ALLEN ET AL
VISOR FOR AUTOMOBILES
Filed July 25, 1922  2 Sheets-Sheet 1

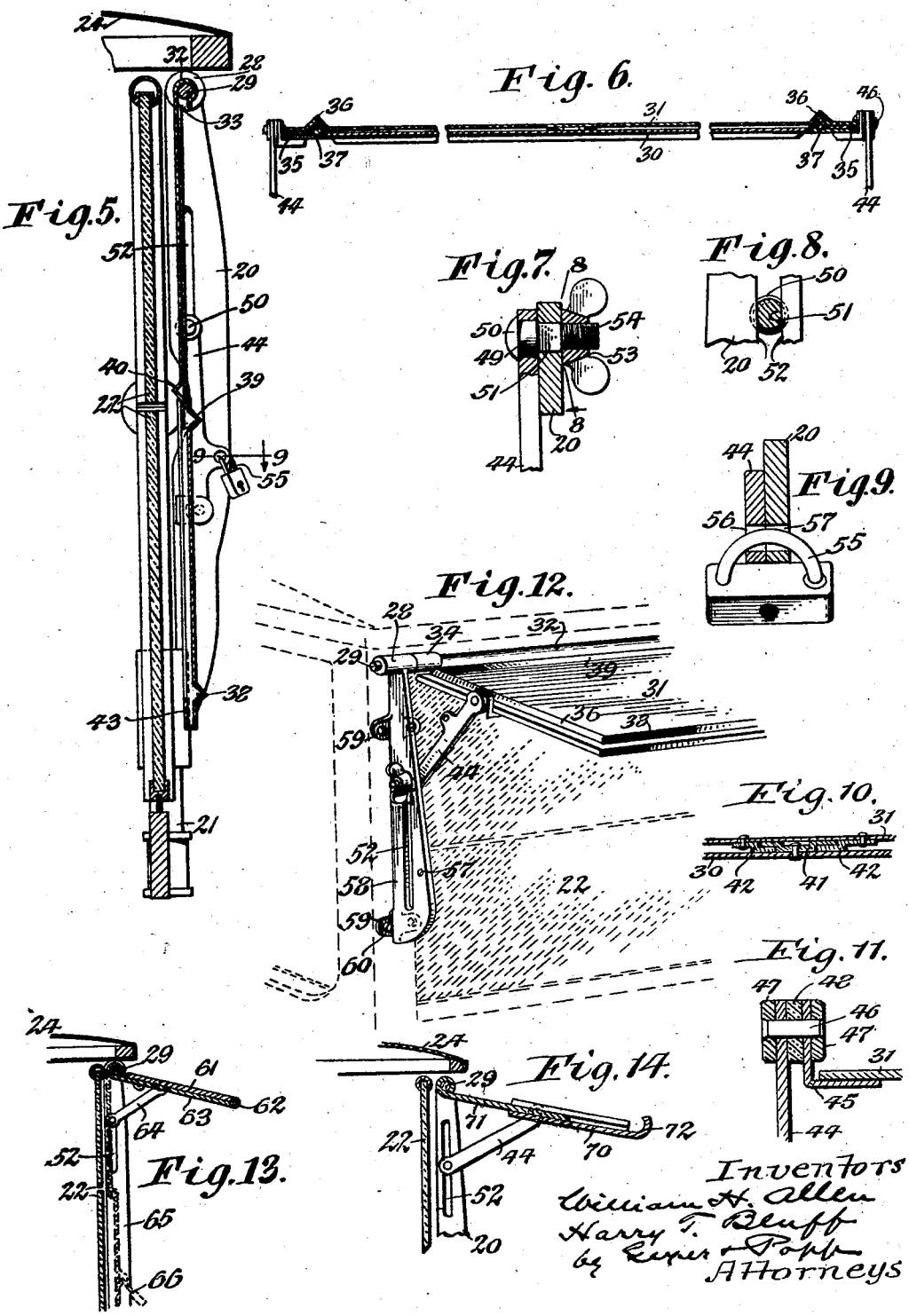

Patented Sept. 21, 1926.

1,600,785

UNITED STATES PATENT OFFICE.

WILLIAM H. ALLEN AND HARRY T. BLUFF, OF BUFFALO, NEW YORK.

VISOR FOR AUTOMOBILES.

Application filed July 25, 1922. Serial No. 577,430.

This invention relates to a visor which is more particularly intended for use on the front of the wind shields of automobiles, although the same may also be used on other vehicles or installations.

It is the purpose of this invention to provide a visor which can be readily adjusted at different angles to suit the amount of shading or protection from the sun which is desired in the car, which can also be readily adjusted so as to either increase or decrease the effective protecting area of the same and thereby enable snow and rain to be deflected from the wind shield under different conditions and maintain the latter in a transparent condition to permit the driver to clearly observe the road ahead of the car, and which can also be extended to such an extent and locked across the front side of the wind shield of the car that entrance to the interior of the same can not be gained on this side and thus aid in preventing theft of the car and unauthorized use of the same.

Figure 1:
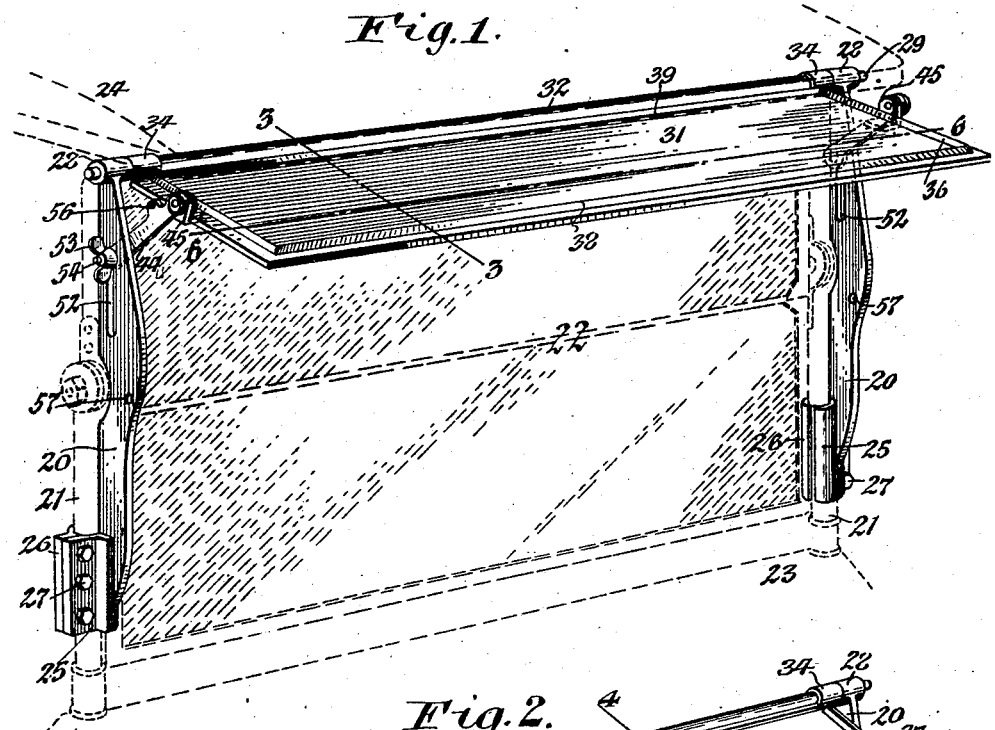
Figure 2:
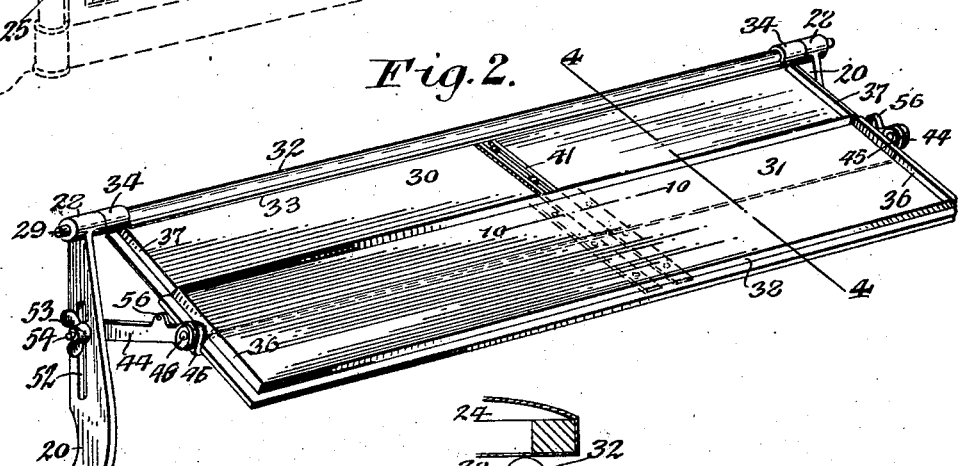
Figure 3:
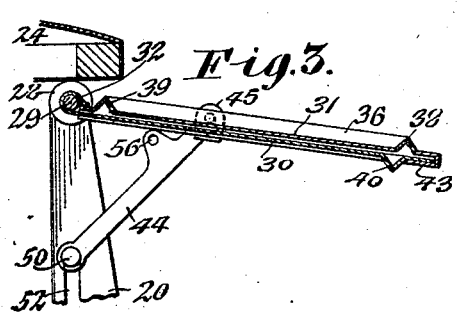
Figure 4:
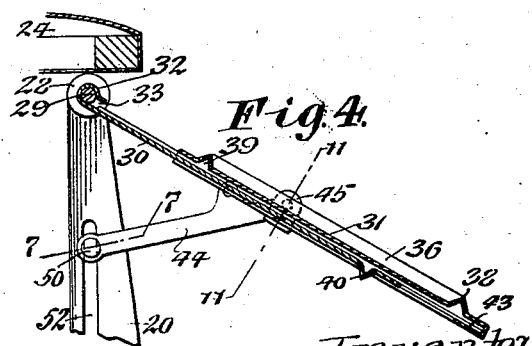

In the accompanying drawings:

Figure 1 is a perspective view of one form of our improved visor showing the same applied to the wind shield or front side of a touring car having upright standards which support the canopy and showing the shutter sections retracted to their fullest extent relatively to each other, so that the same produces the minimum shading or protecting effect upon the interior of the car. Figure 2 is a similar view, but showing the shutter section extended somewhat so as to increase the shading or protecting effect. Figure 3 is a vertical longitudinal section, taken on line 3—3, Fig. 1. Figure 4 is a similar section, taken on line 4—4, Fig. 2. Figure 5 is a fragmentary vertical section, similar to Figs. 3 and 4, but showing the shutter section fully extended or spread, and secured in a vertical position across the front side of the wind shield so as to prevent access through the same into the interior of the car and also showing a view from the interior of the car forwardly to the road ahead, so as to prevent, or at least, interfere with the unauthorized use of the car. Figure 6 is a cross section taken on line 6—6, Fig. 1. Figure 7 is a fragmentary horizontal section, on an enlarged scale, taken on line 7—7, Fig. 4. Figure 8 is a fragmentary vertical section, taken on line 8—8, Fig. 7. Figure 9 is a fragmentary horizontal section, taken on line 9—9, Fig. 5. Figure 10 is a fragmentary section, on an enlarged scale, taken on line 10—10, Fig. 2. Figure 11 is a fragmentary section, on an enlarged scale, taken on line 11—11, Fig. 4. Figure 12 is a fragmentary perspective view of the manner of mounting our invention on an automobile having a permanently enclosed body. Figures 13 and 14 are fragmentary vertical longitudinal sections, similar to Fig. 1, showing modified forms of our invention.

Similar characters of reference refer to like parts throughout the several views.

Referring to Figs. 1–10, 20, 20 represent two upright brackets arranged in front of the upright posts or standards 21, which are of the usual construction and arranged adjacent to opposite vertical edges on the wind shield 22 and mounted at their lower ends on the cowl 23 of the body, while the upper ends support the canopy 24 arranged over the seats of the automobile. These brackets are detachably connected at their lower ends with the standards 21 in any suitable manner, but preferably by means of a pair of clamping jaws 25, 26, which are connected by means of clamping bolts 27 and one of which is preferably formed on the lower end of each of the brackets 20. At its upper end each of these brackets is provided with a bearing or sleeve 28 which is arranged close to the underside of the canopy. Extending horizontally and transversely across the space immediately beneath the canopy and in front of the wind shield 22 is a pivot rod 29 which is supported at its opposite ends in the bearings 28 of the brackets.

30, 31 represent the rear and front sections of a shutter, each of which is preferably of oblong form and constructed of sheet metal and extends across the full width of the wind shield or substantially so, between the brackets 20. The rear transverse edge of the rear shutter section is pivotally mounted on the pivot rod 29 by providing this edge of the rear shutter section with a pivot sleeve 32 formed integrally therewith and extending from the body of this shutter section upwardly and forwardly around the rod 29 but having its extreme edge portion separated from the adjacent body portion of this shutter section, so as to leave a horizontal transverse slot 33 on the front side of this sleeve above the rear shutter section, as shown in Figs. 4 and 5. This rear shutter section is held at a proper distance away from the brackets 20 by means of spacing sleeves 34 arranged on the rod 29 between the opposite ends of the sleeve 32 and the inner sides of the bearing sleeves 28, as best shown in Figs. 1 and 2.

The front shutter section 31 is arranged above the rear shutter section and capable of sliding lengthwise thereon so that these two shutter sections can lie one completely over the other or to be spread apart more or less for the purpose of decreasing or increasing the protecting area of these sections. For this purpose the front shutter section may be guided upon the rear shutter section in any suitable manner, for instance by providing the opposite longitudinal edges of the front shutter section with inwardly opening channels 35 on its underside which receive the adjacent longitudinal edges of the rear shutter section and thus permit the front shutter section to be slid lengthwise on the rear section. In addition to this, the longitudinal edge portions of the two shutter sections may be guided one with reference to the other by providing the outer side of the front shutter section with longitudinal beads 36 which receive corresponding shaped longitudinal beads 37 on the adjacent parts of the rear shutter section, as shown in Fig. 6 whereby these cooperating beads serve to not only aid in guiding these shutter sections relatively to each other, but also serve to materially stiffen and strengthen the same against bending between their front and rear edges. Crosswise bending of these shutter sections is prevented by stiffening and strengthening ribs or beads 38, 39 arranged on the upper side of the front shutter section adjacent to the front and rear edges of the same, and a stiffening rib or bead 40 arranged on the underside of the rear shutter section adjacent to the front edge of the latter, as best shown in Fig. 5.

For the purpose of preventing the central parts of the shutter sections from vibrating relatively to each other and producing a noise, as well as undue wear, means are provided for guiding the central parts of these shutter sections relatively to each other, which means in the preferred form shown in the drawings comprise a T-shaped guide rail 41 secured lengthwise to the outer side of the rear shutter section midway of the opposite longitudinal edges thereof and two guide rails 42 secured to the underside of the front shutter section and engaging underneath the opposite edges of the T-shaped guide rail 41, as best shown in Fig. 10.

When it is desired to secure the minimum amount of shadow or protection from the shutter sections, the front shutter section is pushed rearwardly to its maximum extent, on the rear shutter section so that these sections overlap each other to the fullest extent and practically form one section, as shown in Figs. 1 and 3. In this position of the parts the rear edge of the front shutter section engages with the slot 33 of the pivot sleeve 32 and the front transverse edges of these shutter sections are securely held against displacement vertically relatively to each other by a channel 43 arranged on the underside of the front section and opening rearwardly and receiving the front transverse edge of the rear shutter section, as shown in Fig. 3.

While the two shutter sections are in this completely folded or overlapping position, the same may be swung together about the supporting rod 29, as a pivot into different angular positions, to suit the required amount of shading from the sun which is desired by the occupants of the car.

If a greater amount of shading or protection is desired, as for instance when rain or snow is falling, the protective area of the shutter sections may be increased by sliding the front shutter section forwardly on the rear section and also tilting these sections downwardly to a greater extent, as shown in Figs. 2 and 4, whereby the sun will be warded off to a greater extent and snow and rain will also be deflected to a greater extent from the glass of the wind shield and thus permit the driver and occupants of the car to obtain a clear and unobstructed view forwardly through the windshield of the road ahead without necessitating wiping or cleaning off of the snow from the front side of the wind shield, as is now commonly necessary.

Upon extending the front shutter section to its fullest extent relatively to the rear section, a protecting panel is produced by the combined area of these two sections which may be swung downwardly into a vertical position across the front of the wind shield so as to cover the same fully or nearly so and thus prevent easy access, as shown in Fig. 5, through the wind shield of the car.

Means are provided for adjusting the angularity of the shutter sections and also holding the front section in different longitudinally adjusted positions relatively to the rear section and also locking the shutter sections in a vertical position across the front side of the wind shield. Although various means may be provided for thus adjusting the shutter sections, those shown in the drawings have been found satisfactory in practice and comprise two swinging braces or links 44, each of which is pivotally mounted at its front end on one longitudinal edge portion of the front shutter section while its rear end is mounted on the adjacent bracket 20 so as to be capable of vertical adjustment thereon. The pivotal connection between the front end of each brace 44 and the adjacent longitudinal edge of the front shutter section is preferably effected by means of a bracket 45 secured to the one longitudinal edge portion of the front shutter section, a pivot 46 passing through this bracket and the front end of the respective brace 44, washers 47 of metal secured to the outer ends of the pivot 46 and bearing against the outer sides of the bracket 45 and the brace 44 and a washer 48 of fiber or similar material mounted on the pivot 46 between the bracket 45 and the brace 44, as shown in Fig. 11. This manner of connecting the brace 44 with the front shutter section operates to prevent this joint from becoming tight by rusting or action of the weather and insures an easy pivotal connection which will permit of readily swinging the shutter section about the supporting rod 29 and also sliding the same lengthwise relative to each other.

The means for adjusting the rear end of each brace on the respective bracket 20 which are best shown in Figs. 1-4 and 7 and 8 comprise a clamping bolt having a rounded neck 49 turning in a correspondingly shaped hole in the brace 44, a head 50 bearing against the inner side of the brace 44, a flat sided portion 51 at the opposite end of the neck and engaging with an upright slot 52 in the bracket 20, so as to be capable of sliding vertically therein, but held against turning, and a clamping nut 53 arranged on the outer threaded end 54 of the clamping screw and bearing against the outer side of the adjacent bracket 20. By this means loosening of the nut 53 will permit the clamping bolt to be raised or lowered in the slot 52 so as to bring the two shutter sections at the desired angle and into the required longitudinal position relatively to each other and thereafter a tightening of the nut 53 will hold these parts in this position. This adjustment can be effected by simply loosening the screw nut 53 and moving the clamping bolt vertically, no separate holding of the bolt for preventing turning of the same being necessary, inasmuch as this is accomplished by the flat sided part 51 thereon engaging with the walls of the slot 52. When the front shutter section is moved into its foremost position relatively to the rear shutter section and these two sections are swung into a vertical position across the front side of the wind shield, as shown in Fig. 5, the same may be locked in this position in any suitable manner, for instance by means of a padlock 55 passing through either one or the other of the pivoted braces 44 and the adjacent bracket 20, for which purpose each of the braces 44 is provided with a perforated lug 56 and the adjacent part of the bracket 20 is provided with a perforation 57 adapted to receive the padlock 55.

When the shutter sections are thus extended and locked in the vertical position across the wind shield, entrance into the automobile through the wind shield by breaking the glass of the same in the case of an enclosed car is rendered difficult, if not impossible, and in the case of an open car the presence of the non-transparent shutter sections in front of the wind shield prevents the driver from looking straight ahead over the road. It is therefore apparent that in either case, the presence of the shutter sections across the front of the wind shield will operate as a deterrent against theft of the car or unauthorized use of the same.

When mounting this improved visor on an enclosed car, which is not provided with the usual standards 21, the brackets which support the shutter sections may be constructed as shown in Fig. 12, in which case these brackets 58 are somewhat shorter and provided with lugs 59 which are adapted to receive screws 60 for securing the same to the frame of the enclosed body on opposite sides of the wind shield. These two methods for supporting the visor on an automobile are more particularly designed for using our invention on cars or automobiles as an attachment thereto, but it is to be understood that parts corresponding to the brackets 20 and 58 may be built into the body of a car, so that the visor becomes a built in part of the same instead of being detachably mounted thereon.

Instead of sliding the front shutter section lengthwise on the rear shutter section for the purpose of increasing or decreasing the effective area of the same, the front shutter section 61 may be pivoted by means of a hinge 62 to the front transverse edge of the rear shutter section 63, as shown in Fig. 13. In such organization of our invention, the adjusting brace 64 is connected with the rear shutter section instead of with the front shutter section. Upon folding these pivotally connected shutter sections and swinging the same into a vertical position, the front shutter section may be connected with the adjacent bracket 65 by means of a padlock 66, as shown in Fig. 13, thereby serving to prevent the normal use of the wind shield in the manner similar to that described with reference to the construction shown in Figs. 1-12.

Instead of arranging the front shutter section above the rear shutter section, as shown in Figs. 1-6, the front shutter section 70 may be arranged underneath the rear shutter section 71, as shown in Fig. 14, the construction and manner of operation of these sections in all other respects being substantially like that described in the construction shown in Figs. 1-6.

In the construction shown in Fig. 14, the lower transverse edge of the front shutter section is provided with a transverse gutter or channel 72 which catches the rain running from the rear shutter section on to the front shutter section and discharges the same at opposite longitudinal edges of the visor thus eliminating the falling of any water across the line of view of the driver.

From the foregoing description, it will be apparent that this visor in addition to serving as a sun shade, also operates effectively as a protector against snow and rain fall so as to insure a clear vision of the road for the driver and it can also be utilized to advantage in protecting unauthorized use or operation of a car. Aside from this the construction of this visor is comparatively simple and neat in appearance, it has no delicate parts which are liable to get out of order and it can be quickly and conveniently adjusted as occasion arises.

Moreover, this visor when arranged vertically across the windshield will prevent the formation of ice on the latter if the car is parked for a considerable time during winter.

I claim as my invention:

1. A visor for automobiles &c., comprising a support, a rear shutter section pivotally mounted at its rear edge on said support to swing vertically, a front shutter section slidable on said rear shutter toward and from the pivot of the latter and co-operating longitudinal guides arranged on the opposing central parts of said rear and front shutter sections, one of said guides consisting of a longitudinal strip secured with its central part to one of said shutter sections and having its opposite longitudinal edges offset to form guide flanges, and the other guide consisting of two strips having base portions secured to the other shutter section and each of said last mentioned strips having its unattached longitudinal edge offset to form a guide flange which engages with one of the guide flanges on the other shutter section.

2. A visor for automobiles &c., comprising a support, a rear shutter section pivotally mounted at its rear edge on said support to swing vertically, and a front shutter section slidable on said rear shutter toward and from the pivot of the latter and provided at its front transverse edge with a channel which is adapted to receive the front transverse edge of the rear shutter section.

3. A visor for automobiles &c., comprising two brackets adapted to be mounted on the front of a car and each provided at its upper end with bearings, a horizontal rod supported at its opposite ends in said bearings, a rear shutter section provided at its rear edge with a sleeve which is mounted on said rod, and a front shutter section movably mounted on said rear shutter section and adapted to pass with its transverse rear edge into a transverse slot in said sleeve.

4. A visor for automobiles comprising brackets adapted to be mounted on the front side of an automobile wind shield, a rear shutter section pivotally mounted at its rear end on said brackets to swing vertically, a front shutter section slidable lengthwise on the rear shutter section, braces pivoted at their front ends on opposite longitudinal edges of said front shutter section and adjustable vertically at their rear ends on said brackets, and a lock for connecting one of said braces with the respective bracket when the shutters are spread apart and extended across the windshield of the automobile.

WILLIAM H. ALLEN.
HARRY T. BLUFF.